US012532906B2

(12) United States Patent
Goedeken et al.

(10) Patent No.: US 12,532,906 B2
(45) Date of Patent: Jan. 27, 2026

(54) SHELF STABLE FOOD COATING

(71) Applicant: General Mills, Inc., Minneapolis, MN (US)

(72) Inventors: Doug Goedeken, Blaine, MN (US); Shintaro Pang, New Hope, MN (US); Goeran Walther, Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 744 days.

(21) Appl. No.: 17/205,084

(22) Filed: Mar. 18, 2021

(65) Prior Publication Data

US 2021/0289828 A1    Sep. 23, 2021

Related U.S. Application Data

(60) Provisional application No. 62/992,504, filed on Mar. 20, 2020.

(51) Int. Cl.
*A23P 20/10*    (2016.01)
(52) U.S. Cl.
CPC .................................. *A23P 20/11* (2016.08)
(58) Field of Classification Search
None
See application file for complete search history.

(56) References Cited

U.S. PATENT DOCUMENTS

| | | | |
|---|---|---|---|
| 2010/0136195 A1 | 6/2010 | Coleman | |
| 2010/0272875 A1 | 10/2010 | Wilkes | |
| 2013/0216677 A1 * | 8/2013 | Jensen | A23L 7/191 |
| | | | 426/548 |
| 2016/0205951 A1 | 7/2016 | Christiansen et al. | |
| 2020/0214315 A1 * | 7/2020 | Lefevre | A23L 29/37 |

FOREIGN PATENT DOCUMENTS

| | | | |
|---|---|---|---|
| GB | 2177585 | * | 1/1987 |
| WO | WO 2011/139959 | | 11/2011 |
| WO | WO 2015134374 | * | 9/2015 |

OTHER PUBLICATIONS

Karlee Renkoski, "Sprouted grains give nutrition, flavor and structure to baked foods", Jun. 4, 2019.*
Jeanne Turner, "What Does Sprouting Add to Grains", Nov. 6, 2018.*
Julia et al "Sprouting of oats: A new approach to quantify compositional changes", Jul. 30, 2019.*
"*Grain—Wikipedia*", Retrieved from the Internet: URL:https://en.wikipedia.org/w/index.php?title=Grain&oldid=942366546, Jun. 16, 2016.
"*Breakfast Bar Extension*", Mintel, Retrieved from the Internet: http://www.gnpd.com, Jan. 2006.
Fikry et al., "*Production and Characterization of Palm Date Powder Rich in Dietary Fiber*", Journal of Food Measurement and Characterization, No. 15, pp. 2285-2296, Feb. 1, 2021.

* cited by examiner

*Primary Examiner* — Lien T Tran
(74) *Attorney, Agent, or Firm* — Jordan IP Law, LLC; John L. Crimmins, Esq.

(57) ABSTRACT

A coating having no non-intact sugar sources and having a good texture, flavor, structure, and bowl life is described. A coating includes erythritol in an amount of about 40% to about 70% by dry weight and a sprouted whole grain ingredient in an amount of about 10% to about 30% by dry weight. Also described are coated food pieces and methods of making coated food pieces using a novel coating.

17 Claims, No Drawings

SHELF STABLE FOOD COATING

CROSS REFERENCE TO RELATED APPLICATIONS

This application claims the benefit of U.S. Provisional Patent Application Ser. No. 62/992,504, which was filed on Mar. 20, 2020 and titled "Shelf Stable Food Coating". The entire content of this application is incorporated by reference.

BACKGROUND

Consumers are increasingly looking for foods that meet their nutritional needs without requiring preparation. Shelf stable food items are a category of ready-to-eat foods that can be challenging to make fit both nutritional needs and a desired eating experience. Ready-to-eat food products that contain reduced refined sugar content provide a challenge for delivering a desirable taste and texture over the shelf life of the product. Thus, there is a need for good-tasting ready-to-eat products that meet desired nutritional needs and retain a desirable eating experience over shelf life.

SUMMARY

The present disclosure relates to a coating that has a desirable texture and flavor, an extended bowl life, and good manufacturability without the need of a refined sugar.

A coated food piece is provided herein. A coated food piece includes a base food piece having a surface, and a coating on at least a portion of the surface, the coating including erythritol in an amount of about 40% to about 70% by dry weight of the coating; sprouted whole grain ingredient in an amount of about 10% to about 30% by dry weight of the coating, the sprouted whole grain ingredient having a sugar content of at least 30% or a carbohydrate content of about 60% to about 90%, the carbohydrate content having an average dextrose equivalent (DE) of greater than 30 DE; and no non-intact sugar sources.

In some embodiments, a coating can further include an additional soluble solid content of up to 30% by dry weight of the coating. In some embodiments, an additional soluble solid content can comprise a soluble fiber. In some embodiments, an additional soluble solid content can comprise soluble solid content from a fruit or vegetable powder or puree.

In some embodiments, a coating can further include an oil in an amount of up to 10% by dry weight of the coating.

In some embodiments, a coating can further include a high potency sweetener in an amount of up to 0.5% by dry weight of the coating.

In some embodiments, a base food piece of a coated food piece can include a ready-to-eat (RTE) breakfast cereal piece, a nut or nut piece, a granola, a snack food piece, a seed, or a confectionary food piece.

In some embodiments, a coated food piece provided herein can contain no non-intact sugar sources.

A method of making a plurality of coated food pieces is also provided herein. A method includes providing a plurality of base food pieces each having a surface; applying a coating fluid to at least a portion of the surface of the plurality of base food pieces to form intermediate pieces, and drying the intermediate pieces to form the plurality of coated food pieces. A coating fluid can include erythritol in an amount of about 40% to about 70% by dry weight of the coating fluid; sprouted whole grain ingredient in an amount of about 10% to about 30% by dry weight of the coating fluid, the sprouted whole grain ingredient having a sugar content of at least 30% or a carbohydrate content with an average dextrose equivalent (DE) of greater than 30 DE; a moisture content of about 10% to about 40% by weight of the coating fluid; and no non-intact sugar sources.

In some embodiments, a method provided herein can further include producing a coating fluid by combining the erythritol, the sprouted whole grain ingredient, and water; and adjusting the viscosity of the coating fluid to a viscosity of less than 700 cP at 220° F. In some embodiments, the adjusting step can include adding a soluble fiber. In some embodiments, the viscosity can be adjusted to a viscosity of from about 200 cP to about 600 cP at 220° F.

In some embodiments, a method provided herein can further include separating the plurality of coated food pieces.

In some embodiments, a method provided herein can further include packaging the plurality of coated food pieces.

These and various other features and advantages will be apparent from a reading of the following detailed description.

DETAILED DESCRIPTION

Consumers often look for convenient foods that fit a desired nutritional profile. Foods that have reduced refined sugar content and/or have low net carbohydrate content fit one such nutritional profile. Excluding refined sugar content is a particular challenge for sweetened coatings, such as those found on ready-to-eat (RTE) cereals, because sugar, particularly sucrose, not only provides sweetness for such coatings, but also plays a significant role in their structure and functionality, including providing a crisp or crunchy texture for RTE cereals and snacks, and extending bowl life for RTE cereals. As a result, excluding refined sugars in coatings can negatively impact flavor, texture, and overall functionality. Although at least some of the sweetness of sugar can be replaced by using non-sugar sweeteners, such as sugar alcohols (e.g., erythritol, maltitol, and the like) and high intensity sweeteners (e.g., sucralose, stevia extract, and the like), non-sugar sweeteners fail to provide texture and function of sugar. For example, simply replacing sucrose in a coating with erythritol can result in a coating that is difficult to manufacture since erythritol has a lower glass transition temperature ($T_g$) than sucrose. As a result, an erythritol coating can retain a soft or tacky texture immediately after drying and cooling (i.e., at time 0), although the coating hardens and loses tackiness over time as full crystallization is reached (e.g., after 3 or 4 days).

It was discovered, and is disclosed herein, that a coating can be made including a sugar alcohol and a sprouted whole grain ingredient, and containing no non-intact sugar sources, that provides an eating experience similar to a sucrose-based coating. A coating provided herein surprisingly provides a coating with a similar texture to a typical sucrose-based coating, while including essentially no sucrose. A coating provided herein can beneficially improve bowl life of a RTE cereal relative to an uncoated RTE cereal. In some embodiments, a coating provided herein can provide a benefit of being able to be made and applied to food pieces using standard manufacturing equipment and processes. A coating provided herein can be unexpectedly non-sticky after drying and cooling (i.e., at time 0), unlike a coating containing erythritol as the only source of soluble solids content (defined as the water-soluble ingredients of the coating).

As used herein, a "sugar" is a monosaccharide or a disaccharide. As used herein, sources of sugar that are considered intact sugar sources include non-extracted malted or sprouted whole grains; non-concentrated fruit or vegetable purees, pulps, and pastes; concentrated fruit or vegetable purees, pulps, and pastes; fruit or vegetable powder; non-sweetened fruit pieces; non-sweetened dried fruit; the sugar portion of inulin and other fiber ingredients; allulose; and any other sugar sources that are otherwise unrefined. A "non-intact sugar source," as used herein, refers to fractions, extracts or other derivatives of an intact sugar source that does not contain the entire contents of the intact sugar source, with the exception of water content. As used herein, non-sugar sweeteners, such as sugar alcohols (e.g., erythritol, maltitol, and the like) and high potency sweeteners (e.g., *stevia* extract, monk fruit extract, sucralose, and the like) are not considered sugars.

A coated food piece is provided herein that includes a novel coating on at least a portion of a surface of the coated food piece. A coating provided herein includes a sugar alcohol (e.g., erythritol, maltitol, lactitol, and the like) in an amount of about 40% to about 70% (e.g., about 45% to about 65%, or about 50% to about 60%) by dry weight of the coating. Erythritol is particularly useful for its ability to crystallize to contribute to a crisp or crunchy coating. In embodiments where a coating is desired to include only organic ingredients, erythritol from organic sources can be preferred.

A coating provided herein also includes a sprouted whole grain ingredient in an amount of from about 10% to about 30% (e.g., about 15% to about 25%) by dry weight of the coating. As used herein, a "sprouted whole grain ingredient" refers to an ingredient (e.g., a flour, pulp, puree, powder, paste, or the like) produced from the entire contents of a whole grain (e.g., wheat, oat, rice, barley, or the like) that has been germinated for sufficient time to produce a sprout. That is, a sprouted whole grain ingredient includes the sprout and the seed portion of a grain, including all the contents of the seed portion (e.g., bran, germ, and endosperm). A sprouted whole grain ingredient does not refer to fractions, extracts or other derivatives of a sprouted grain that do not contain the entire sprouted grain contents.

In some embodiments, a suitable sprouted whole grain ingredient includes a sprouted whole grain ingredient having a sugar content of at least 30% (e.g., at least 35%, or from about 35% to about 60%, from about 35% to about 50%, or from about 40% to about 45%) by dry weight of the sprouted whole grain ingredient. In some embodiments, the sugar content of a sprouted whole grain ingredient can include maltose in an amount of at least 70% (e.g., at least 75%, or at least 80%) by weight of the sugar content.

In some embodiments, a suitable sprouted whole grain ingredient includes a sprouted whole grain ingredient having a carbohydrate content of from about 60% to about 90% (e.g., about 70% to about 90%, about 75% to about 90%, or about 80% to about 85%) by dry weight of the sprouted whole grain ingredient. In some embodiments, the carbohydrate content of a sprouted whole grain ingredient can have an average dextrose equivalent (DE) of greater than 30 (e.g., at least 32, from 32 to 40, or from 34 to 38).

Unexpectedly, a sprouted whole grain ingredient as provided herein can combine with a sugar alcohol to achieve a coating including no non-intact sugar sources and that does not have the disadvantages of using a sugar alcohol alone. For example, a sprouted whole grain ingredient having a carbohydrate content with an average DE of 32 to 40 can provide an advantage of producing a coating that is less sticky after drying and cooling than an equivalent coating that replaces the sprouted whole grain ingredient with a syrup (e.g., corn syrup) with the same average DE.

In some embodiments, a sprouted whole grain ingredient can provide additional benefits, such as a pleasant malted flavor and/or a brown coloration to a coated food piece without requiring a browning reaction (e.g., browning by cooking the coating or roasting a coated food piece).

In some embodiments, a coating provided herein can include additional soluble solids other than soluble solids contributed by sugar alcohol and sprouted whole grain ingredient. Additional soluble solids can be included in an amount of up to 30% (e.g., from about 2% to about 25%, about 5% to about 20%, or from about 10% to about 20%) by dry weight of a coating provided herein. In some embodiments, soluble solids can include other intact sugar sources, such as non-concentrated fruit or vegetable purees, pulps, and pastes; concentrated fruit or vegetable purees, pulps, and pastes; fruit or vegetable powder; allulose; or the like; or combinations thereof. In some embodiments, soluble solids can include one or more soluble fiber. Suitable soluble fibers include, without limitation, inulin, soluble corn fiber, other soluble fibers derived from sources, such as oats, barley, corn, beans, peas, carrots, apples, citrus fruits, chicory root, or the like.

In some embodiments, a coating provided herein can include a fat in an amount of up to 10% (e.g., from about 1% to about 8%, or from about 2% to about 7%) by dry weight of the coating. Any edible fat is suitable for inclusion in a coating provided herein. Particularly useful are fats that are low in saturated fats, which are typically liquid at room temperature (i.e., oils). In some embodiments, a fat can be selected based on benefits to manufacture, such as the ability to reduce coating build up on equipment, such as enrobers.

In some embodiments, a coating provided herein can include a high potency sweetener (e.g., *stevia* extract, monk fruit extract, sucralose, and the like) in an amount suitable to provide a desired level of sweetness to a coated food piece provided herein. In some embodiments, a high potency sweetener can be included in a coating provided herein in an amount of up to 0.5% by dry weight of the coating.

Other suitable ingredients for inclusion in a coating provided herein can include flavorants (e.g., cinnamon, cocoa powder, vanilla, and the like), colorants (e.g., extracts, juices, dyes, and the like), and the like, so long as they do not contribute non-intact sugar sources to the coating. In some embodiments, ingredients in an entire coated food piece can include no non-intact sugar sources.

In some embodiments, all of the ingredients of a coating provided herein can be considered organic. In some embodiments, all of the ingredients in an entire coated food piece can be considered organic.

A coating provided herein can contribute insoluble solids that can be visible (e.g., with or without a microscope) on the surface of a coated food piece. Examples of insoluble solids that can be visible on a surface of a coated food piece can include bran from a sprouted whole grain ingredient. In embodiments where a fruit or vegetable puree, powder, pulp, or paste is included in a coating provided herein, insoluble solids, such as seed pieces or skin pieces from the fruit or vegetable may be visible.

A coating provided herein is suitable for many different types of base food pieces, such as ready-to-eat (RTE) cereal pieces, snack food pieces, nuts and nut pieces, dried fruits, seeds, confection pieces, and the like. A coating provided herein is particularly useful for coating RTE cereal pieces, as it provides a desired crunchy or crisp texture. In addition, a coating provided herein can increase bowl life of a RTE cereal piece over an uncoated cereal piece. For example, a RTE cereal piece coated with a coating provided herein can have a bowl life of at least 1 minute (e.g., at least 2 minutes, at least 3 minutes, or at least 5 minutes).

Methods of making a coated food are also provided herein. A method of making a coated food includes applying a coating fluid to at least a portion of a surface of a plurality of food pieces to form intermediate pieces. A coating fluid suitable for application to the surface of a plurality of food pieces includes a sugar alcohol in an amount of about 40% to about 70% (e.g., about 45% to about 65%, or about 50% to about 60%) by dry weight of the coating fluid, a sprouted whole grain ingredient in an amount of about 10% to about 30% (e.g., about 15% to about 25%) by dry weight of the coating fluid, and no non-intact sugar sources. Generally, a coating fluid has sufficient moisture to allow for the fluid to be handled using standard equipment. For example, a coating fluid can include up to 40% (e.g., about 5% to about 35%, or about 10% to about 30%) by weight of the coating fluid. In some embodiments, a soluble fiber (e.g., inulin or soluble corn fiber) can be used to adjust the viscosity of a coating fluid provided herein. In some embodiments, viscosity of a coating fluid provided herein can be adjusted (e.g., by adjusting moisture content, oil content, and/or soluble fiber content) to a viscosity of less than 700 cP (e.g., from about 200 cP to about 600 cP, or about 250 cP to about 550 cP) at 220° F. as measured at 50 rpm using a Bookfield viscometer fitted with a #3 spindle.

Intermediate pieces can be dried to form coated food pieces. In some embodiments, drying can be done at a temperature and time sufficient to achieve a moisture content of about 1.5% to about 5.5% (e.g., about 1.5% to about 4%, or about 1.5% to about 3%) of the coating on the coated food pieces. The moisture of coated food pieces after drying can depend on the type of food piece used. For example, the moisture of a coated RTE cereal food piece after drying can be about 1.5% to about 5.5% (e.g., about 1.5% to about 4%, or about 1.5% to about 3%), while the moisture content of a different food piece (e.g., a nut or a seed) might be different.

In some embodiment, a drying step can be done at a temperature of about 200° F. to about 300° F. (e.g., from about 220° F. to about 280° F., or about 230° F. to about 260° F.) for a time of about 5 minutes to about 25 minute (e.g., about 7 minutes to about 20 minutes, or about 10 minutes to about 15 minutes).

In some embodiments, a cooling step can be included after the drying step, which cools the coated food pieces to a surface temperature of less than 90° F. (e.g., less than 75° F.).

In preferred embodiments, methods provided herein produce non-sticky (i.e., non-adhesive, non-cohesive) coated food pieces comprising a plurality of food pieces, each food piece having a surface, with the above-discussed coating or composition provided on at least a portion of the surface. In some embodiments, some coated food pieces may loosely adhere. However, adhered pieces coated according to a method provided herein are generally easy to break apart to form a free-flowing product.

Coated food pieces provided herein can be packaged together in a package, with or without other food pieces. That is, the food pieces of the present invention can be combined with food pieces not produced in the manner described above. For example, RTE cereal base pieces having a coating provided herein can be combined with nuts, seeds, grain-based pieces, legume-based pieces, dried fruits, confectionary pieces or another type of cereal base piece without a coating provided herein. Preferably, the coated food pieces are packaged within 5 hours of the drying step, more preferably less than 90 minutes (with a surge bin) and as short as a few minutes (without a surge bin). The coated food pieces are non-sticky (i.e., non-adhesive, non-cohesive) immediately (typically within 10 minutes) after cooling, which facilitates packaging soon after cooling.

The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A coated food piece, comprising:
   a. a base food piece having a surface, and
   b. a coating on at least a portion of the surface, the coating including:
      i. erythritol in an amount of about 40% to about 70% by dry weight of the coating;
      ii. sprouted whole grain ingredient in an amount of about 10% to about 30% by dry weight of the coating, the sprouted whole grain ingredient having a sugar content of at least 30% or a carbohydrate content of about 60% to about 90%, the carbohydrate content having an average dextrose equivalent (DE) of greater than 30 DE; and
      iii. no non-intact sugar sources.

2. The coated food piece of claim 1, wherein the coating further includes an additional soluble solid content.

3. The coated food piece of claim 2, wherein the additional soluble solid content comprises a soluble fiber.

4. The coated food piece of claim 2, wherein the additional soluble solid content comprises soluble solid content from a fruit or vegetable powder or puree.

5. The coated food piece of claim 1, wherein the coating further comprises an oil.

6. The coated food piece of claim 1, wherein the coating further comprises a high potency sweetener.

7. The coated food piece of claim 1, wherein the base food piece comprises a ready-to-eat (RTE) breakfast cereal piece, a nut or nut piece, a granola, a snack food piece, a seed, or a confectionary food piece.

8. The coated food piece of claim 1, wherein the coated food piece contains no non-intact sugar sources.

9. A method of making a plurality of coated food pieces, the method comprising:
   a. providing a plurality of base food pieces each having a surface;
   b. applying a coating fluid to at least a portion of the surface of the plurality of base food pieces to form intermediate pieces, the coating fluid including:
      i. erythritol in an amount of about 40% to about 70% by dry weight of the coating fluid;
      ii. sprouted whole grain ingredient in an amount of about 10% to about 30% by dry weight of the coating fluid, the sprouted whole grain ingredient having a sugar content of at least 30% or a carbohydrate content with an average dextrose equivalent (DE) of greater than 30 DE;
      iii. a moisture content of about 10% to about 40% by weight of the coating fluid; and
      iv. no non-intact sugar sources; and
   c. drying the intermediate pieces to form the plurality of coated food pieces.

10. The method of claim 9, further comprising producing the coating fluid by:

a. combining the erythritol, the sprouted whole grain ingredient, and water; and b. adjusting the viscosity of the coating fluid to a viscosity of less than 700 cP at 220° F.

11. The method of claim 10, wherein the adjusting step includes adding a soluble fiber.

12. The method of claim 10, wherein the viscosity is adjusted to a viscosity of from about 200 cP to about 600 cP at 220° F.

13. The method of claim 9, further comprising packaging the plurality of coated food pieces.

14. The coated food piece of claim 2, wherein the additional soluble solid content is included in an amount of up to 30% by dry weight of the coating.

15. The coated food piece of claim 5, wherein the oil is included in an amount of up to 10% by dry weight of the coating.

16. The coated food piece of claim 6, wherein the high potency sweetener is included in an amount of up to 0.5% by dry weight of the coating.

17. The coated food piece of claim 1, wherein the sugar content of the sprouted whole grain ingredient includes maltose in an amount of at least 70% by weight of the sugar content.

* * * * *